United States Patent Office 3,064,027
Patented Nov. 13, 1962

3,064,027
MANUFACTURE OF ALKYL ALUMINUM SESQUIHALIDES
Leonard C. Kreider, Wadsworth, and Norbert S. Mason, Akron, Ohio, assignors to Goodrich-Gulf Chemicals, Inc., Cleveland, Ohio, a corporation of Delaware
No Drawing. Filed Aug. 19, 1959, Ser. No. 834,632
6 Claims. (Cl. 260—448)

This invention relates to the production of alkyl aluminum sesquihalides and more especially to a novel continuous process for the production of an alkyl aluminum sesquihalide by the reaction of an alkyl halide with metallic aluminum in the presence of the alkyl aluminum sesquihalide that is being produced.

It has heretofore been proposed to produce alkyl aluminum sesquihalide by the reaction of an alkyl halide with metallic aluminum but such prior procedures have failed to yield economically an alkyl aluminum sesquihalide of high quality.

The reaction between metallic aluminum and an alkyl halide is a highly exothermic one and further needs be carried out in inert circumambient media. The problem of removing the large amount of the exothermically generated heat is one that has not heretofore been satisfactorily solved and the attainment of high yields with the elimination of wasteful by-products has not heretofore been effectively accomplished.

Applicants have discovered as a result of extensive research and experimentation a novel and economical process of accomplishing these results. This involves the reaction of aluminum and an alkyl halide in a continuous operation to produce an alkyl aluminum sesquihalide of high quality by a novel series of steps, in which the high exothermically generated heat of reaction between the aluminum and alkyl halide is absorbed by the vaporization of part of the alkyl halide reactant in such manner that the exothermically generated heat of reaction and the heat absorbed by the vaporization of the alkyl halide balance out so as to maintain an operative reaction temperature in the liquid phase in which the exothermic reaction takes place, without either external heating or cooling. This is accomplished in a suitable reactor by spraying a liquid solution of the alkyl halide in liquid alkyl aluminum sesquihalide of the kind being produced downwardly on to a mass of metallic aluminum chips which are being agitated, to form relatively thin films of the liquid solution on the surfaces of the metallic aluminum chips, without submerging the metallic aluminum in the said solution, so that the alkyl halide in liquid solution in the said films are both in intimate reactive contact with the surfaces of the metallic aluminum to react therewith, the reaction occurring within the liquid film, and also the liquid solution of alkyl halide is present in the liquid film during the reaction to absorb, and to be vaporized by, the exothermic heat generated in the film by the reaction. The vapors escaping from the films carry away the exothermic heat of the reaction, as the vapors move from the said films through the reactor to a suitable vapor outlet in the reactor, and at the same time effectively keep the said liquid films, which are in surface contact with the metallic aluminum chips and in which the exothermic reaction takes place, at a moderate temperature, without employing for this purpose a cooling jacket for the walls of the reactor or heat-exchanger within the reactor in which the alkyl halide reacts with the metallic aluminum to produce the alkyl aluminum sesquihalide.

The alkyl halide is introduced into the reactor in a liquid solution with the alkyl aluminum sesquihalide not only because the latter acts as a vehicle for carrying the alkyl halide into surface film contact with the metallic aluminum chips, but also because the alkyl aluminum sesquihalide is a catalyst for the reaction between the alkyl halide and the metallic aluminum, and its presence in the film, wherein the reaction between the alkyl halide and the metallic aluminum takes place, is essential to an effective reaction between the alkyl halide and the metallic aluminum.

In the liquid solution of the alkyl halide in the liquid alkyl aluminum sesquihalide, above referred to, there is employed an excess of alkyl halide over that required for reacting with the metallic aluminum to form the alkyl aluminum sesquihalide, and for vaporizing the alkyl halide to carry away the exothermal heat, this excess being dissolved in the alkyl aluminum sesquihalide and removed from the reactor along with it, as presently described.

The spraying of the liquid solution of the alkyl halide and alkyl aluminum halide onto the metallic aluminum chips is continuous, keeping at all times relatively thin liquid films of the liquid solution on the metallic aluminum surfaces which films are constantly changing, the incoming solution rewetting the said surfaces and washing from the aluminum surfaces the liquid films containing the newly formed alkyl aluminum sesquihalide, so that there collects in the bottom of the reactor a mixed liquid containing (1) the alkyl aluminum sesquihalide admitted to the reactor with the solution of alkyl halide, (2) the newly formed alkyl aluminum sesquihalide, and (3) the excess of the alkyl halide, referred to in the next preceding paragraph, dissolved in the alkyl aluminum sesquihalide. The mixed liquid is continuously withdrawn from the bottom of the reactor to avoid the formation of a pool in which the metallic aluminum chips would otherwise be submerged. Thereafter, the alkyl halide is readily stripped from the liquid mixture withdrawn from the reactor by a conventional vacuum stripper to produce a high quality alkyl aluminum sesquihalide.

The reaction hereinabove mentioned of an alkyl halide with metallic aluminum may be represented by the following equation:

$$3RHa + 2Al \rightarrow 2R_x—Al—Ha_y \qquad (1)$$

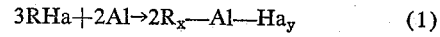

in which R is an alkyl radical having from 1 to 4 carbon atoms, Ha is a halogen having an atomic weight greater than 35, and RHa is an alkyl halide having a boiling point under normal pressure (760 mm.) not lower than −25° C., and $x$ and $y$ are numbers whose sum totals 3. Where the $x$ and $y$ are equal numbers, the reaction product is generally represented by the formula $$R_{1.5}—Al—Ha_{1.5} \qquad (2)$$

which is an alkyl aluminum sesquihalide that is a mixture of equal parts of $R_2$—Al—Ha and R—Al—Ha$_2$. However, in the above reaction (1) of this invention, the values of $x$ and $y$ generally vary somewhat from the 1.5 values, but always each $x$ and $y$ is greater than zero, and normally ranges from 1.0 to 2.0. The term "alkyl aluminum sesquihalide" is used in the trade and in this application in a broad sense to include mixtures of alkyl aluminum halides within the formula $$R_x—Al—Ha_y \qquad (3)$$

in which R and Ha have the same significance indicated above in Equation 1, and $x$ and $y$ are each numbers whose sum totals 3 and the value of each $x$ and $y$ is greater than zero.

General Example

While it is to be understood that the invention of this application is not limited to any particular apparatus for carrying out the process thereof, generally there is employed a reactor with means for purging the reactor of air and moisture with an inert gas, such as dry nitrogen, argon and the like, the reactor being equipped with means for charging into the reactor metallic aluminum chips purged of air and moisture, means for agitating the aluminum chips within the reactor, as for example a ribbon blender, means for spraying a liquid downwardly upon, and substantially uniformly over, the aluminum chips within the reactor, means for venting vapors from the upper portion of the reactor, and means for withdrawing the liquid mixture from the bottom of the reactor, preferably without permitting a pool of the liquid mixture to collect in the reactor so as to submerge any considerable portion of the aluminum chips.

Into such a reactor, purged of all air and moisture, is charged metallic aluminum chips, also free of air and moisture, in an amount which only partially fills the reactor, and the aluminum chips are kept in a state of agitation at a relatively fast rate. In order to facilitate the initiation of the reaction, the reactor and aluminum chips may be preliminarily heated to somewhat above the boiling point of the alkyl halide, although it is to be understood that this preliminary step is not essential. Then a liquid solution of an alkyl halide in an alkyl aluminum sesquihalide, the latter preferably being of substantially the same composition as the alkyl aluminum sesquihalide being produced, the liquid solution comprising 50 to 90 percent by weight of the alkyl halide, is then sprayed downwardly upon and over the agitating aluminum chips, the liquid solution wetting the surfaces of the aluminum chips with films of the alkyl halide-alkyl aluminum sesquihalide solution. The alkyl halide in the films reacts with the aluminum contiguous the films to produce the desired alkyl aluminum sesquihalide, with the generation of considerable exothermic heat of reaction released within the films, which exothermically generated heat vaporizes part of the alkyl halide in the films and hence reduces the temperature of the liquid of the films by evaporative cooling, the vapors thus formed being removed from the reactor by the vapor venting means in the upper part of the reactor. Experience has demonstrated that the rate of admission of the solution of alkyl halide and alkyl aluminum sesquihalide can be regulated so that there is a balance between the amount of heat exothermically generated by the chemical reaction within the films and the amount of heat removed from the films by the evaporative cooling of the alkyl halide, the temperature attained in the films serving to control the balance, and for any specific alkyl halide the temperatures are more or less uniform. However, the temperature in the films during the reaction is not critical, a wide range of temperatures being operative. Generally, any temperature in the reactive films higher than boiling point of the alkyl halide and lower than the boiling point of the alkyl aluminum sesquihalide is operative, and by adjusting the flow of the solution of alkyl halide and alkyl aluminum sesquihalide into the reactor, temperatures within the operative range for any alkyl halide may be readily maintained, the temperature in any case depending on the particular alkyl halide taking part in the reaction. The reactor is preferably operated at or near atmospheric pressure, the vapors of the alkyl halide being withdrawn as formed to maintain a near atmospheric pressure in the reactor.

The liquid solution sprayed downwardly from the upper part of the reactor over the aluminum chips drips downwardly through the mass of aluminum chips from film to film on the surfaces thereof, and carries with it increasing amounts of newly produced alkyl aluminum sesquihalide and decreasing amounts of the alkyl halide, which increase and decrease in amounts are due (1) to the reaction of part of the alkyl halide with the aluminum to form added alkyl aluminum sesquihalide, and (2) to the vaporization of part of the alkyl halide for effecting the evaporative cooling, which vapors are removed, as above described, from the reactor. The liquid mixture, now containing a lower amount of alkyl halide and a higher amount of alkyl aluminum sesquihalide than the original solution introduced into the reactor, is withdrawn from the reactor, any sediment removed therefrom and the alkyl halide stripped from the liquid mixture, as by vacuum stripping, to yield the alkyl aluminum sesquihalide in a greater amount than that which was introduced into the reactor in solution with the alkyl halide, the difference in these two latter amounts being the net yield of the alkyl aluminum sesquihalide in the process of this application.

In factory operations, it is advantageous to carry out the above described process as a continuous operation in which, while apparatus described above may be used, it is preferable that it be modified somewhat to adapt it for the continuous process. Thus, the reactor may have a horizontal cylindrical fixed shell with a double-ribbon blender therein for slowly and thoroughly agitating the aluminum chips. The aluminum chips are preferably introduced into the reactor through a nitrogen purged metering lock, preferably one equipped to record the amount of the aluminum chips introduced into the reactor, and the aluminum chips are passed into the reactor either continuously or intermittently from time to time to maintain at all times a substantial mass of aluminum chips in the reactor. The liquid solution of alkyl halide and alkyl aluminum sesquihalide is continuously delivered to the reactor by a recording measuring pump and/or through a recording liquid meter and sprayed downwardly upon and over the aluminum chips at such a rate as is needed to maintain dripping films of the liquid solution on the surfaces of aluminum chips and workable temperatures within the films. The liquid mixture which collects on the bottom of the reactor is continuously withdrawn from the reactor, preferably without permitting a pool of the liquid mixture to form in the bottom of the reactor. The liquid mixture withdrawn contains a small amount of sediment, since the aluminum charged into the reactor is substantially consumed in the chemical reaction with the alkyl halide, except for impurities and particles of aluminum adhering to the impurities, and consequently the sediment is separated from the liquid mixture to give a clear liquid solution of alkyl halide and alkyl aluminum sesquihalide. The alkyl halide is stripped from the clear liquid solution, as by a vacuum stripper, and thus to produce in the continuous operation the alkyl aluminum sesquihalide, which is pumped to a storage tank by a recording measuring pump and/or through a recording liquid meter, and thus to measure the amount of the alkyl aluminum sesquihalide. The difference in the measured amount of alkyl aluminum sesquihalide coming from the reactor and the measured amount of alkyl aluminum sesquihalide introduced into the reactor in the solution with the alkyl halide gives a measured amount of the net yield of the alkyl aluminum sesquihalide resulting from the process of this application.

In factory operations, in order to conserve the alkyl halide gases vented from the reactor and stripped from the liquids withdrawn from the reactor, these gases are, in separate apparatus, compressed and cooled to form a liquid alkyl halide, which is used in making up the liquid solution of alkyl halide and alkyl aluminum sesquihalide for the starting solution of the process.

*Example 1*

As illustrative of the continuous operation process of this invention, and utilizing the apparatus described above in the General Example for continuous factory operation, into a stationary horizontal cylindrical reactor having a transparent window permitting the inspection of the operation within the reactor, and having a ribbon blender operating parallel to the horizontal axis of the cylinder, there are charged aluminum chips, purged of air and moisture, in amount to more than half fill the reactor, the aluminum chips being kept in a state of agitation by the ribbon blender. As the reaction proceeds, further supplies of purged aluminum chips are charged into the reactor as described in the General Example. A drum of a solution comprising 2050 grams of ethyl chloride and 872 grams of ethyl aluminum sesquichloride, that is, 70 parts of ethyl chloride to 30 parts of ethyl aluminum sesquichloride, is prepared, and a metering pump is disposed in a conduit connecting the drum and the means for spraying the solution downwardly into the reactor over the aluminum chips. Generally, it is preferable to preliminarily heat the reactor and the aluminum chips therein to the normal reaction temperature of the aluminum with the ethyl chloride, namely, about 75°–80° C., although it is not essential as the exothermal heat of reaction will bring the reactor to operating temperature. The solution is then continuously sprayed downwardly on and over the aluminum chips in amounts that maintain dripping films of the liquid solution on the surfaces of the aluminum chips and maintain the temperature within working limits, as from 50° to 90° C., which liquid solution gradually drips downwardly from chip to chip to the bottom of the reactor. The liquid mixture is withdrawn from the bottom of the reactor, any sediment therein removed, and the ethyl chloride stripped from the clear liquid mixture by a vacuum stripper operated at 15 mm. pressure. The ethyl aluminum sesquichloride is pumped from the stripper to a storage tank through a conduit in which is a recording liquid meter to measure the amount of the ethyl aluminum sesquichloride withdrawn from the reactor. Calculations of the net yield of ethyl aluminum sesquichloride produced during the run show that 307.2 grams of ethyl aluminum sesquichloride were produced.

*Example II*

Carrying out the process of this invention as above described in Example I, but using equal parts by weight of each the ethyl chloride and the ethyl aluminum sesquichloride, as 2050 grams of each, upon calculation, the net yield of ethyl aluminum sesquichloride was found to be 289.2 grams.

*Example III*

In another run, the procedure followed in Example I was employed, starting with 2050 grams of ethyl chloride and 205 grams of ethyl aluminum sesquichloride, or 90 parts of ethyl chloride to 10 parts of ethyl aluminum sesquichloride. Upon calculation, the net yield of ethyl aluminum sesquichloride was found to be 248.7 grams.

The above Examples II and III demonstrate that the percentage by weight of ethyl aluminum sesquichloride is not critical, since it acts only as a vehicle for the ethyl chloride and as a catalyst of the reaction between the ethyl chloride and the metallic aluminum.

To demonstrate the operability of the process of this invention, short run tests are made with different alkyl halides and corresponding alkyl aluminum sesquihalides, utilizing however the same operative steps as outlined in the process of the preceeding Example I.

*Example IV*

Into a purged reactor of the type employed in Example I, there are charged and agitated at a slow rate aluminum chips free of air and moisture. The reactor and its contents are preliminarily heated to somewhat above the boiling point of the alkyl halide, in order to facilitate the initiation of the reaction between the alkyl halide and the alkyl aluminum sesquihalide. One liter of a liquid solution containing 70 parts by weight of the alkyl halide and 30 parts of the alkyl aluminum sesquihalide is sprayed continuously downwardly over the aluminum chips in the reactor at a rate to maintain an operable temperature, namely, from above the boiling point of the alkyl halide to below the boiling point of the alkyl aluminum sesquihalide. The liquid solution is caused to drip downwardly through the aluminum chips in the manner described in connection with the prior examples, until all the solution is sprayed over the aluminum chips, drips to and is collected from the bottom of the reactor. The liquid mixture is freed of sediment, stripped of alkyl halide, and the amount of the resulting alkyl aluminum sesquihalide determined, from which is calculated the amount of the net yield of the alkyl aluminum sesquihalide.

The above described tests of the alkyl halides and alkyl aluminum sesquihalides, listed in the following table, demonstrate that in each case a substantial yield of alkyl aluminum sesquihalide is obtained.

STARTING SOLUTION OF ALKYL HALIDE AND ALKYL ALUMINUM SESQUIHALIDE

| Test No. | Alkyl Halide | Alkyl Aluminum Sesquihalide |
| --- | --- | --- |
| 1 | methyl chloride | methyl aluminum sesquichloride. |
| 2 | n-butyl chloride | n-butyl aluminum sesquichloride. |
| 3 | i-butyl chloride | i-butyl aluminum sesquichloride. |
| 4 | methyl bromide | methyl aluminum sesquibromide. |
| 5 | ethyl bromide | ethyl aluminum sesquibromide. |
| 6 | propyl bromide | propyl aluminum sesquibromide. |
| 7 | n-butyl bromide | n-butyl aluminum sesquibromide. |
| 8 | i-butyl bromide | i-butyl aluminum sesquibromide. |
| 9 | methyl iodide | methyl aluminum sesquiiodide. |
| 10 | ethyl iodide | ethyl aluminum sesquiiodide. |
| 11 | propyl iodide | propyl aluminum sesquiiodide. |
| 12 | n-butyl iodide | n-butyl aluminum sesquiiodide. |
| 13 | i-butyl iodide | i-butyl aluminum sesquiiodide. |

It is to be understood that variations and modifications of the invention herein disclosed may be made by those skilled in the art without departing from the spirit and scope of this invention and it is intended the claims hereto appended shall cover all features of patentable novelty residing in the invention as hereinabove described.

What is claimed is:

1. In a process for the production of an alkyl aluminum sesquihalide within the formula $R_x$—Al—$Ha_y$, wherein R is an alkyl radical having from 1 to 4 carbon atoms and Ha is a halogen having an atomic weight greater than 35, $x$ and $y$ are each numerical values whose sum equals 3 and each of which is greater than zero, by reacting metallic aluminum with an alkyl halide of the formula RHa, wherein R and Ha have the same significance as above defined, the process which comprises forming on the surfaces only of metallic aluminum entirely within a circumambient inert gaseous zone of reaction thin liquid films of a preformed liquid solution of an above defined alkyl halide and an above defined alkyl aluminum sesquihalide so as to effect an exothermal reaction between the alkyl halide in the thin liquid films and the metallic aluminum at the surfaces of the aluminum and thus producing alkyl aluminum sesquihalide within the liquid films and which becomes a part of the liquid films, removing the exothermal heat of reaction generated within the liquid films by vaporization of alkyl halide in the liquid films into the gaseous zone of reaction, withdrawing the alkyl halide vapors thus produced from the gaseous zone of reaction to a region entirely outside of and independent of the gaseous zone of reaction, removing the liquid films from the surfaces of the metallic aluminum into a pool outside the zone in which the metallic aluminum is being reacted, and recovering the alkyl aluminum sesquihalide from the liquid of the pool.

2. The process defined in claim 1 in which the alkyl halide is ethyl chloride and the alkyl aluminum sesquihalide is ethyl aluminum sesquichloride.

3. In a process for the production of an alkyl aluminum sesquihalide within the formula $R_x$—Al—Ha, wherein R is an alkyl radical having from 1 to 4 carbon atoms and Ha is a hologen having an atomic weight greater than 35, $x$ and $y$ are each numerical values whose sum equals 3 and each of which is greater than zero, by reacting metallic aluminum with an alkyl halide of the formula RHa, wherein R and Ha have the same significance as above defined, the process which comprises agitating a mass of metallic aluminum particles wholly within an inert circumambient gaseous zone of reaction, spraying downwardly on the mass of aluminum particles while in agitative movement wholly within said gaseous zone a preformed liquid solution of an above defined alkyl halide and an above defined alkyl aluminum sesquihalide at a rate to form relatively thin liquid surface films on the surfaces of said aluminum particles and to cause the liquid of the films to drip downwardly through the mass of aluminum particles to form liquid films on the aluminum particles throughout the entire mass of aluminum particles to a zone beneath the gaseous zone of reaction in which the aluminum particles are located, and to effect highly exothermal reactions between the alkyl halide in the thin liquid films and the aluminum particles and thus producing within and adding to the liquid films alkyl aluminum sesquihalide, the rate of spraying also being such as to maintain in the zone of reaction a temperature higher than the boiling point of the alkyl halide and lower than the boiling point of the alkyl aluminum sesquihalide, removing the exothermal heat of reaction generated within the liquid films by vaporization of alkyl halide in the liquid films into the gaseous zone of reaction, withdrawing the alkyl halide vapors thus produced from the gaseous zone of reaction to a region entirely independent of the gaseous zone of reaction, removing the liquid films from the surfaces of the meallic aluminum into a pool outside the zone in which the metallic aluminum is being reacted, and recovering the alkyl aluminum sesquihalide from the liquid of said pool.

4. The process defined in claim 3 in which the alkyl halide is ethyl chloride and the alkyl aluminum sesquihalide is ethyl aluminum sesquichloride.

5. In a continuous process for the production of an alkyl aluminum sesquihalide within the formula

$$R_x\text{—}Al\text{—}Ha_y$$

wherein R is an alkyl radical having from 1 to 4 carbon atoms and Ha is a halogen having an atomic weight greater than 35, $x$ and $y$ are each numerical values whose sum equals 3 and each of which is greater than zero, by reacting metallic aluminum with an alkyl halide of the formula RHa, wherein R and Ha have the same significance as above defined, the process which comprises agitating within an inert gaseous zone of reaction a mass of metallic aluminum chips, continuously spraying downwardly on the mass of aluminum chips, while in agitative movement, a preformed liquid solution of said alkyl halide and said alkyl aluminum sesquihalide being produced at such a rate as to form thin liquid surface films of said solution on the surfaces of the aluminum chips and as to cause the liquid from the surface films to drip downwardly through the mass of aluminum chips to a zone beneath the gaseous zone of reaction in which the film-surfaced aluminum chips are located, maintaining within the inert gaseous zone of reaction the mass of aluminum chips by addition thereto of more aluminum chips as the said chips are converted into liquid alkyl aluminum sesquihalide by the reaction of the alkyl halide with the aluminum and as the newly formed liquid alkyl aluminum sesquihalide is added to the liquid films dripping down through the chips to the zone beneath the gaseous zone of reaction, continuously removing the exothermal heat of reaction generated within the liquid films by vaporization of alkyl halide in the liquid films into the gaseous zone of reaction and continuously withdrawing the alkyl halide vapors thus produced from the gaseous zone of reaction to a region entirely independent of said gaseous reaction zone to keep the temperature of the liquid films within an operative range, continuously withdrawing the liquid solution dripping down from the liquid films on aluminum chips to prevent build-up of the liquid solution and the immersion of the aluminum chips therein, and recovering the alkyl aluminum sesquihalide from the liquid solution so withdrawn.

6. The process defined in claim 5 in which the alkyl halide is ethyl chloride and the alkyl aluminum sesquihalide is ethyl aluminum sesquichloride.

References Cited in the file of this patent

UNITED STATES PATENTS

| | | |
|---|---|---|
| 2,863,894 | Smith | Dec. 9, 1958 |
| 2,903,469 | Hawkins et al. | Sept. 8, 1959 |

OTHER REFERENCES

Grignard et al., Bull. Soc. Chimie de Paris, vol. 37 (1925), pp. 1378 and 1379.